US 6,717,945 B1

(12) United States Patent
Jue et al.

(10) Patent No.: US 6,717,945 B1
(45) Date of Patent: Apr. 6, 2004

(54) QUEUE SIZE ARBITRATION METHOD AND APPARATUS TO ENHANCE PERFORMANCE OF CROSSBAR CELL SWITCH

(75) Inventors: Reginald Jue, Manhattan Beach, CA (US); David A. Wright, Solana Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 778 days.

(21) Appl. No.: 09/596,738

(22) Filed: Jun. 19, 2000

(51) Int. Cl.[7] .............................................. H04L 12/28
(52) U.S. Cl. ................... 370/392; 370/395.71; 370/415
(58) Field of Search ........................ 370/395.3, 395.71, 370/412, 415, 416, 392, 414; 340/2.28

(56) References Cited

U.S. PATENT DOCUMENTS

| 5,923,644 | A  | * | 7/1999 | McKeown et al. ......... 370/230 |
| 6,449,283 | B1 | * | 9/2002 | Chao et al. ................. 370/461 |
| 6,563,837 | B2 | * | 5/2003 | Krishna et al. ............. 370/413 |

OTHER PUBLICATIONS

Yuji Oie, et al., "Performance Analysis of Nonblocking Packet Switch with Input and Output Buffers," IEEE Transactions on Communications, vol. 40, No. 8, Aug. 1992.

* cited by examiner

*Primary Examiner*—Duc Ho
(74) *Attorney, Agent, or Firm*—McAndrews Held & Malloy

(57) ABSTRACT

The present invention provides a method and apparatus for arbitration among the inputs of a crossbar cell switch. The input cells of the crossbar cell switch are stored at their respective input ports in input queues prior to switching. The first cell of each input queue is known as the Head of Line (HoL) cell. For each set of HoL cells that may be directed to a specific output port, the HoL cell with the largest input port queue size is assigned to be switched during the current switching epoch. The method and apparatus for arbitration allows the crossbar cell switch to operate with smaller input queues, increasing the throughput of the switch and minimizing both the transit delay for the data cells through the switch and the buffer size needed to accommodate input queues.

34 Claims, 5 Drawing Sheets

QUEUE SIZE ARBITRATION METHOD AND APPARATUS TO ENHANCE PERFORMANCE OF CROSSBAR CELL SWITCH

BACKGROUND OF THE INVENTION

The present invention generally relates to an arbitration method for a crossbar cell switch. More particularly, the present invention relates to a method for arbitrating among crossbar cell switch input queues to select the data to be sent to an output port during a particular switching epoch.

A crossbar switch is a switch that has, conceptually, a set of input (horizontal) paths, a set of output (vertical) paths, and a set of crosspoint switches or crosspoint elements, for interconnecting any one of the vertical paths to any one of the horizontal paths. Crossbar switches may be used in communications applications to provide switching for data or information packets, including Asynchronous Transfer Mode (ATM) cells. ATM cells are 53 bytes in size and are partitioned into a 5-byte header field and a 48-byte information field. When a crossbar switch is used to switch cell-based data traffic, such as ATM traffic, the crossbar switch may be referred to as a crossbar cell switch. The cells switched by the crossbar cell switch may be referred to alternatively as packets or data traffic. The period of time for a cell to be switched from its input port to any output port may be referred to alternatively as a switching epoch or a cell transfer epoch.

Crossbar cell switches may be used in a wide variety of communications applications. For example, whenever cells are received via more than one input port (horizontal path) and the communications traffic from any input needs to be directed to one of multiple output ports (vertical path), a crossbar cell switch may be used. Crossbar cell switches may be used in data switching fabrics including fiber optic or other network hubs, for example.

While many applications for crossbar cell switches exist throughout the communications field, certain design goals are universal. For example, arbitration between input ports is preferably simple and fast to accommodate the high speed cell switching typical of modern cell switching fabrics such as ATM (Asynchronous Transfer Mode) cell switching fabrics. In the past, however, crossbar cell switches have fallen short of these goals.

In typical crossbar cell switches, only one cell may be transferred to a given output port during each cell transfer (switching) epoch. Since two or more input ports may each concurrently have a cell directed to a specific output port, a crossbar cell switch must arbitrate between input ports for service during the current cell transfer (switching) epoch. In other words, the crossbar cell switch must determine which input port may send data to a particular output port during the current cell transfer epoch.

Furthermore, each input port is preferably associated with a buffer to hold cells that cannot be transferred during the current cell transfer epoch. Typically, this buffer forms a first-in-first-out (FIFO) queue at each input port. The cell at the head of the queue at each port is referred to as the "head of line" cell (HoL). Any cell in the queue, including the HoL cell, may be destined to any output port.

In the past, arbitration methods assigned the cell transfer opportunity (which HoL cell to switch) for a given output port for the current cell transfer epoch to the first encountered HoL cell directed to that output. For instance, the cell transfer opportunity for output j for the current cell transfer epoch was assigned by examining, in consecutive order, the HoL cells at each input queue and selecting the first HoL cell directed to output j.

This approach, which consistently gives first opportunities to input port with low index, may be categorized as "unfair." Additionally, other techniques, including examining the input ports in round robin (cyclic) order were used in the past. In a cyclic technique, the HoL cells at each input queue are examined in sequence beginning with a different, sequential, input port each time. Cyclic techniques attempted to achieve "fairness" (i.e., to prevent a single input port from monopolizing transfer resources.)

After selection of the HoL cell to be transferred to output port j during the current cell transfer epoch, other HoL cells directed to output j are blocked and cannot be transferred during the current cell transfer epoch. Additionally, the cells in each queue following the blocked HoL cells are also blocked because only an HoL cell may be transferred to an output port.

Further examination of the crossbar cell switch operating under existing arbitration methods reveals that if, for instance, the HoL cells of multiple input ports are directed towards the same output port j, a delay of one switching epoch per input port directed to output port j results before all the HoL cells have been switched to the output port j. During this delay, additional cells may arrive at any of the input ports, but must wait until the HoL cell has been switched (transferred) before the new cells (or any other cells higher in the queue) may be considered; this is often termed head of line cell blocking. If the delay in transfer is sufficiently long, cells arriving at an input port overrun that input port's queue and the incoming cell is lost.

This HoL cell blocking phenomenon may result in saturation (i.e., the queue sizes at the input ports grow without bound) when the average transfer load (cells switched per transfer epoch) reaches a certain level. That is, when the crossbar cell switch must transfer a certain average number of cells per cell transfer epoch per input port greater than its saturation threshold, the crossbar cell switch cannot meet the demand and the input port queues grow without bound. The threshold point for saturation may vary based on the type of crossbar cell switch and the system in which it is used. The upper bound on saturation is 1.0 cells per transfer epoch per input port. Generally, switching 1.0 cells per transfer epoch per input port is an unachievable goal in a crossbar cell switch. Theoretical analysis of round robin and other fair arbitration shows that a crossbar cell switch with fair arbitration will saturate when the average cell transfer rate approaches 0.58 cells per switch epoch at any input port.

In operation, an input port may be loaded to 100 percent, during peak loading conditions, so that one cell arrives per input epoch over an extended interval. Saturation may be avoided if the duration of a switch epoch is less than the duration of an input epoch so that, on average, more than one switching opportunity exists for each arriving cell. Alternately, the cycle rate at which switch transfers occur may be higher than the cycle rate at which cells arrive at the input ports.

The ratio of the rate at which switch transfer opportunities (i.e., cycles) occur to the maximum rate at which cells arrive at the input ports is known as the overspeed ratio. For typical fair arbitration methods, the overspeed ratio must be at least 1/0.58 (or about 1.70) to ensure that an input port may handle a peak load without entering saturation. Also, in a typical system, the overspeed ratio is even higher than 1.70 so that the likelihood of a large input queue is minimized.

In yet another know arbitration method, the cyclic examination of input ports start with the input port currently having the largest queue. This arbitration method results in lower input queue occupancy than does the round-robin start referred to previously. However, this arbitration method also experiences saturation at approximately 0.58 cells per switch epoch which seems to be a performance limit on all fair arbitration methods, including the present invention.

The basic performance of a crossbar cell switch is discussed in "Performance Analysis of Nonblocking Packet Switch with Input and Output Buffers," Oie, Murata, Kubota, Miyahara, IEEE Transactions on Communications, Vol. 40, No. 8, August 1992 (hereafter Oie). Oie discloses a non-blocking packet switch with input buffers, however, Oie does not address arbitration techniques for improving the performance of crossbar cell switches.

Thus, a need exists for an improved crossbar cell switch arbitration method able to switch a greater number of data cells per switching epoch to provide a higher saturation threshold and/or a reduced minimum overspeed ratio.

SUMMARY OF THE INVENTION

One object of the present invention is to provide crossbar cell switch and a queue arbitration method to provide more efficient switching between input and output ports.

Another object of the present invention is to provide an improved crossbar cell switch arbitration method based on the size of the input port queues of the subset of input ports whose Head of Line (HoL) cells are addressed to a common output port.

Another object of the present invention is to provide an improved crossbar cell switch arbitration method which permits a lower overspeed ratio to support a given input load, subject to the theoretical saturation limit for a crossbar switch. A lower overspeed ratio results in lower power required to operate the cell switch, which is particularly beneficial in a satellite-based switch.

Another object of the present invention is to provide an improved crossbar cell switch arbitration method which allows for smaller queue sizes for a given overspeed ratio. Reducing the size of the input queues reduces switching delays and permits the input buffer size to be reduced providing a reduction in the overall weight of the crossbar cell switch which may, in turn, significantly reduce switch manufacturing and installation costs, particularly when the crossbar cell switch is used in a satellite-based system.

Another objective of the present invention is to provide an improved crossbar cell switch which minimizes the maximum input queue size. Longer input queues result in longer buffer delays which may increase Cell Delay Variation (CDV). Decreasing CDV provides higher data throughput quality of service by minimizing fluctuations in propagation delays through the switch.

Another objective of the present invention is to provide an improved crossbar cell switch which permits a simple queue size comparison based on the most significant bit of the queue size. The queue size comparison may also be based on the index of the most significant bit of the queue size when expressed in binary form, or equivalently the integer portion of the binary logarithm of the queue size. Reducing the number of bits to be considered at each comparator in the switch may provide for faster arbitration while educing the overall weight of the crossbar cell switch.

Another objective of the present invention is to provide an improved crossbar cell switch which permits a simple architecture and logic structure for the crosspoint element of the crossbar cell switch.

Another objective of the present invention is to provide an improved crossbar cell switch which permits a "fair" treatment of all input ports in that no input port may monopolize any output port to the exclusion of all other input ports.

Another objective of the present invention is to provide an improved crossbar cell switch which uses a logic tree for fast arbitration among multiple input ports having HoL cells addressed to a common output port.

Another objective of the present invention is to provide an improved crossbar cell switch in which the arbitration and data transfer periods proceed in parallel, lowering the overall time for each switching epoch and improving the overspeed ratio.

One or more of the foregoing objects are met in whole or in part by an improved arbitration method and apparatus for a crossbar cell switch.

In the crossbar cell switch the input ports have buffers that hold queues of cells awaiting transfer to an output port. The first cell of each non-empty queue is known as the Head of Line (HoL) cell. The arbitration method includes identifying input queues having HoL cells directed to a predetermined output port, comparing the sizes of said input queues, responsively generating a queue select signal, and switching a HoL cell from an associated input queue to an output port in response to said queue select signal. The comparison of the sizes of the input queues returns the input queue with the greatest size. The comparison may also be performed on, for example, the binary logarithms of the queue sizes, or on the integer portion of the binary logarithm of the queue sizes which may be equivalent to the index of the most significant bit of the queue size expressed in binary notation. The switching step of the current switching epoch may proceed in parallel with the identifying and comparing steps of the next subsequent switching epoch.

These and other features of the present invention re discussed or apparent in the following detailed description of the preferred embodiments of the invention.

DESCRIPTION OF THE PREFERRED EMBODIMENTS

Figure 1:
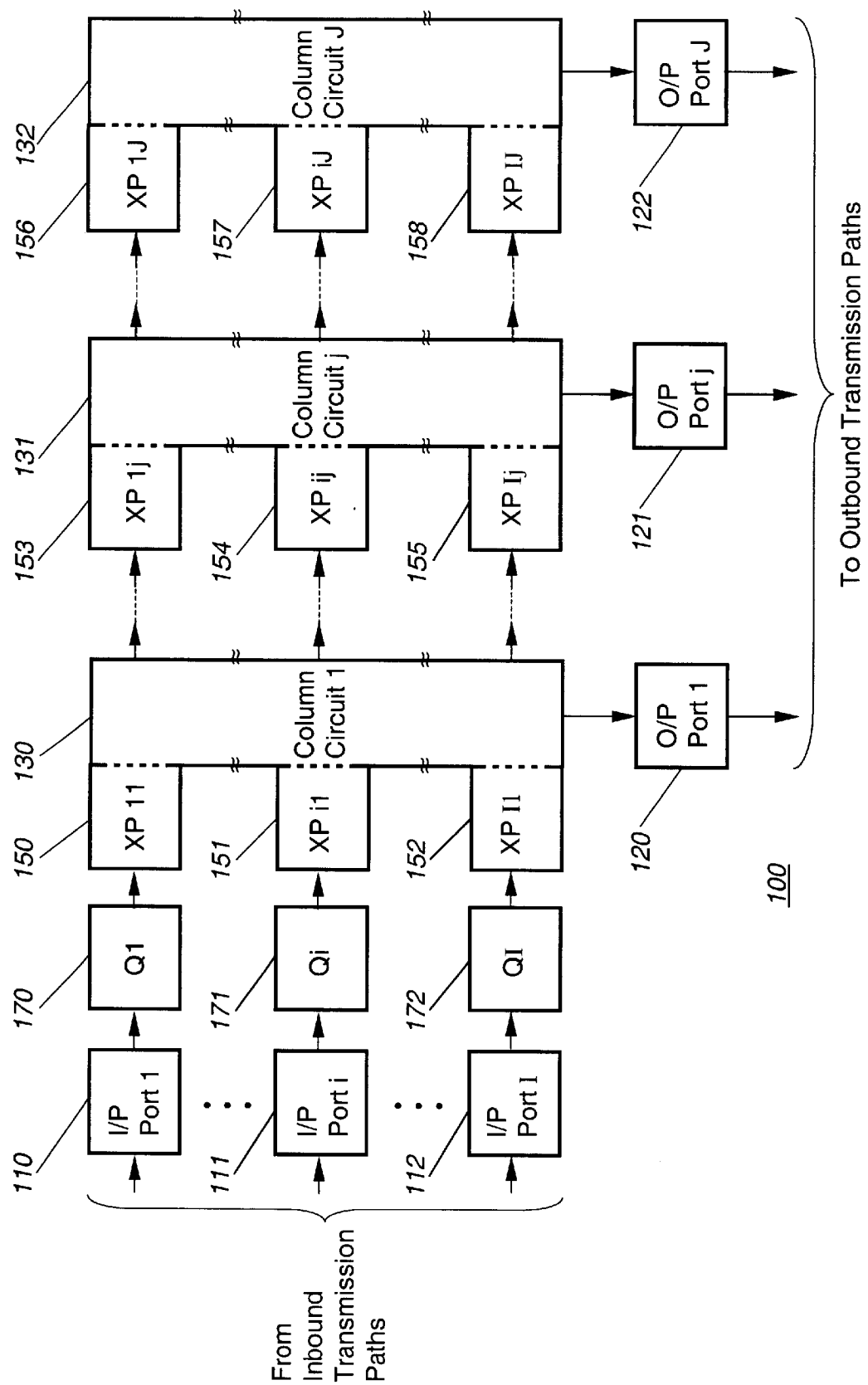
FIG. 1 shows the structure of a crossbar cell switch of the present invention with I input ports and J output ports.

FIG. 1 illustrates a crossbar cell switch 100. The crossbar cell switch 100 includes I input ports (I/P), denominated I/P Port 1 through I/P Port I, each input port forming an inbound transmission path to the crossbar cell switch 100. The inbound transmission paths may be, for example, electrical or optical in nature and may be, for example, a part of a terrestrial or satellite-based communications system. FIG. 1 shows three of the I input ports of the crossbar cell switch 100, namely input port 1 110, input port i 111, and input port I 112.

The crossbar cell switch 100 also include I input buffers containing input queues, denominated Q1 through QI, each input queue associated with an input port. Cells arriving at the input ports (110–112) of the crossbar cell switch 100 enter a first-in, first-out queue in the buffer associated with the input port until the cell is switched to an output port. FIG. 1 shows three of the I input queues of the crossbar cell switch 100, namely input queue 1 170, input queue i 171, and input queue I 172.

Crossbar cell switch 100 also includes J output ports (O/P), denominated O/P Port 1 through O/P Port J, each output port serving an outbound transmission path from the crossbar cell switch 100. FIG. 1 shows three of the J output ports of the crossbar cell switch 100, namely output port 1 120, output port j 121, and output port J 122.

Each output port is associated with a single column circuit, denominated column circuit 1 through column circuit J. Each column circuit may provide an electrical connection between any input port and the output port associated with the column circuit. FIG. 1 shows three of the J column circuits of the crossbar cell switch 100, namely column circuit 1 130, column circuit j 131, and column circuit J 132.

The crossbar cell switch 100 also includes I*J crosspoints, denominated XP(1,1) through XP(I,J), defining the areas of electrical interconnection, as well as associated logic circuitry, in each column circuit (130–132), between the input ports (110–112) and the output ports (120–122). FIG. 1 thus shows nine of the full set of I*J crosspoints of the crossbar cell switch 100. These crosspoints are shown as XP(1,1) 150, XP(i,1) 151, XP(I,1) 152, XP(1,j) 153, XP(i,j) 154, XP(I,j) 155, XP(1,J) 156, XP(i,J) 157, and XP(I, J) 158. Alternatively, the crossbar cell switch 100 may be conceptualized as two sets of buses, one set portrayed as rows (from the input ports (110–112)) and one set portrayed as columns (to the output ports (120–122)).

Cells incoming to the crossbar cell switch 100 are stored in First-In First-Out (FIFO) input queues (170–172) at each input port (110–112). The first cell in each queue is termed the Head of Line (HoL) cell. The crossbar cell switch 100 switches cells from the input ports (110–112) to assigned output ports (120–122) during a switching epoch. A switching epoch is generally considered a complete cell switching operation and typically includes both the amount of time necessary to resolve which input port queue HoL cell to switch and the amount of time necessary to complete the actual switch. Alternatively, the switching epoch may be thought of as the inverse of the number of cell switching opportunities per second by the column circuit. One cell from each input port (110–112) may be switched to any one output port (120–122) during any switching epoch.

Figure 2:
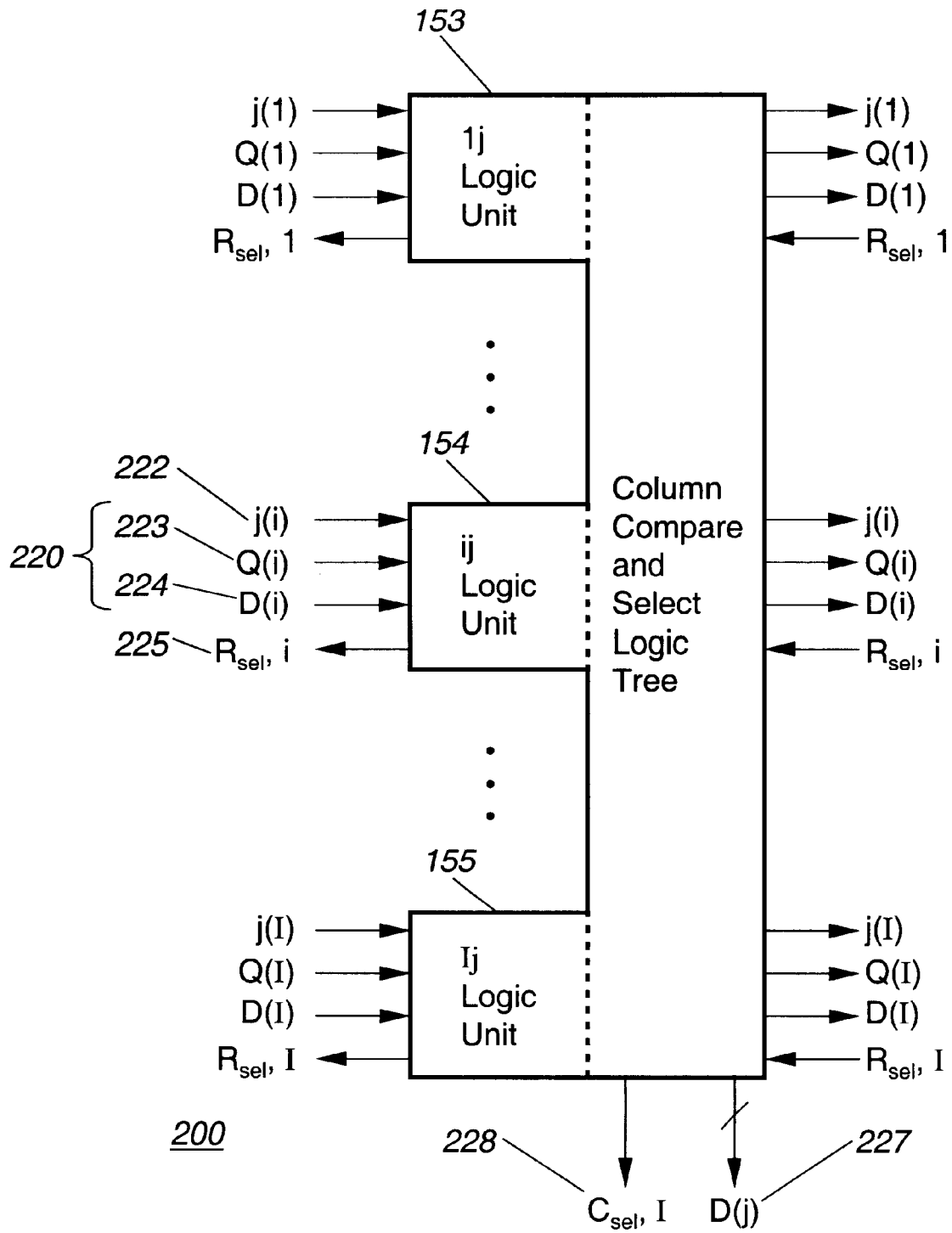
FIG. 2 depicts the column structure of a single column of the crossbar cell switch of the present invention.

FIG. 2 illustrates a column circuit j 200 in expanded form. The column circuit j 200 of FIG. 2 represents the jth column circuit 131 of the crossbar cell switch 100. All column circuits in the crossbar cell switch 100 may share a similar structure to the column circuit 200. The column circuit j 200 includes I crosspoint logic units, denominated logic unit(1,j) through logic unit(I,j). FIG. 2 shows three crosspoint logic units of the I crosspoint logic units of the crossbar cell switch 100, namely logic unit(1,j) 153, logic unit(i,j) 154, and logic unit(I,j) 155. The first index of the logic unit refers to the input port from which the logic unit receives signals.

The second index of the logic unit refers to the output port to which the logic unit may transmit signals through the column circuit of the logic unit.

Each logic unit is responsive to four signals.

With particular reference to the logic unit(i,j) 154 in the ith row 220 in the jth column circuit 200, the signals include: the HoL address signal 222, j(i); the queue size signal 223, Q(i); the row data path 224, D(i); and the (horizontal) row select signal 225, $R_{sel}$,i. The first signal is the HoL address signal 222 which supplies the logic unit 154 in the $i^{th}$ row 220 with the output port index for the HoL cell at the ith input queue. That is, the HoL address signal 222 tells the logic unit 154 the destination output port of the HoL cell at the input queue for the input port i 111. The second signal is the queue size signal 223, Q(i), which supplies the logic units in the ith row 220 with the number of cells in the input queue at the corresponding input port i 111. The third signal is the row data path 224, D(i), which is the path taken by the HoL cell from the input port i 111 to its destination column circuit and output port. The fourth signal is the horizontal row select 225, $R_{sel}$,i, which is true when the input port i's HoL cell may be transferred. That is, the $R_{sel}$,i, signal 225 is the "on-switch" for switching the HoL cell at the input port i 111. As will be explained below, the $R_{sel}$,i signal 225 is activated by one of the column circuits' compare and select logic when the HoL cell in Q(i) is designated by the arbitration logic for the transfer at the current switch epoch.

The j(i), Q(i), and D(i) signals are sent from the input port i 111 to all of the logic units that are connected to the input port i, 111 that is, all logic units in the ith row 220. Conversely, the $R_{sel}$,i signal is activated in logic unit i,j 154 by an output of the compare and select logic tree of the column circuit j 200. The circuit bearing Rsel,i 225 signal is routed through all of the logic units of the row associated with input port i 111 and terminates in input port i 111.

The column circuit j 200 also includes two output signals provided to the jth output port 121. These output signals include the column data path 227, D(j) (which is the path taken by the cell being switched from an input port to the output port j 121 for example). The output signals also include the column select 228, $C_{sel}$,j (which is true when a cell may be transferred to the output port j 121).

The following table summarizes the input and output signals to column circuit j 200:

| Signal Name | Symbol | Description |
| --- | --- | --- |
| HOL Address | j(i) | Output port index, j, for the HoL cell at input i |
| Queue Size | Q(i) | Number of cells in the queue at input port i |
| Row Data Path | D(i) | Data from input i |
| Row Select | $R_{sel}$, i | True when input i's HoL cell may be transferred |
| Column Data Path | D(j) | Data to output j |
| Column Select | $C_{sel}$, j | True when a cell may be transferred to output j |

Figure 3:
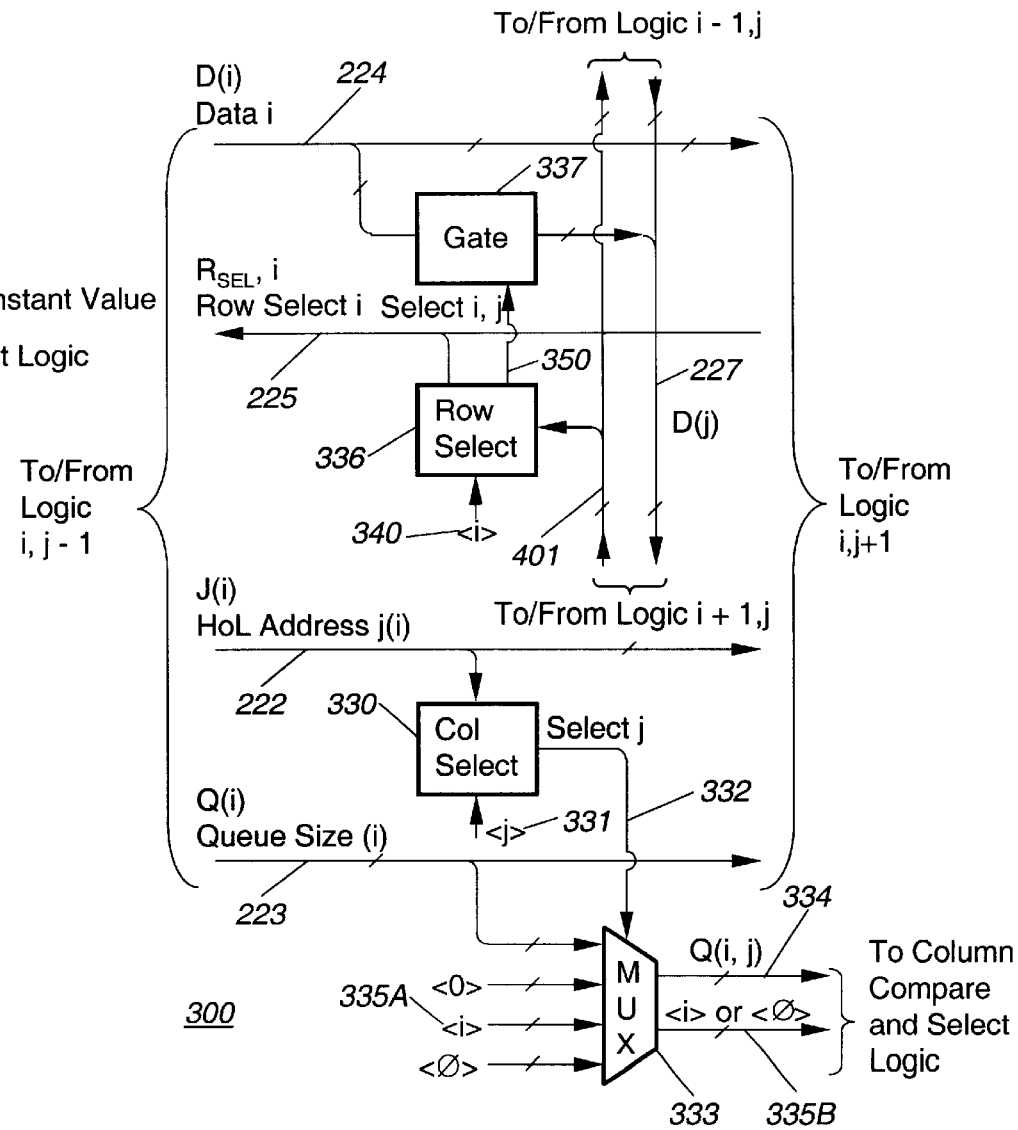
FIG. 3 is a more detailed view of a logic diagram at a single crosspoint element in the crossbar cell switch of the present invention.

Turning to FIG. 3, that figure illustrates an expanded view of the ijth Logic Unit, 154, showing one implementation of the crosspoint logic unit 300 for the ith row 220 of the jth column circuit 200. The crosspoint logic unit 300 includes a column select circuit 330, a multiplexor 333, a row select logic 336, and a logic gate 337.

The crosspoint logic unit 300 first reads the HoL address signal 222, j(i). If the queue size Q(i) 223 is zero for the input port i 111, the HoL address signal j(i) 222 is disabled. Otherwise, the column select circuit 330 compares the HoL address signal j(i) 222 to the column number 331 of the logic unit 300 and examines the signals for a match. That is, the HoL address j(i) 222 is examined to determine if the HoL cell at the input port i 111 is destined for the output port j 121. If the HoL address signal j(i) 222 matches the column number 331, a select j signal 332 activates a multiplexor 333.

When the multiplexor 333 is activated, the multiplexor 333 switches the queue size signal Q(i) 223 and the row index number "i" 335A of the ith input port 111 through the multiplexor 333. The multiplexor 333 takes the queue size signal Q(i) 223 and forms a new signal Q(i,j) 334. The new signal Q(i,j) 334 carries the same information as the queue size signal Q(i) 223 and the j index of the signal. The signal Q(i,j) 334 indicates for notation purposes that the signal Q(i,j) 334 pertains to the multiplexor 333 of a crosspoint logic unit in the column circuit j 131. The signal Q(i,j) represents the size of the queue for one of the subset of input ports, input port i 111, which are contending for output port j during the current switching epoch. As will be described in more detail below, the signal Q(i,j) 334 is passed to a column compare and select logic tree.

Additionally, when the multiplexor 333 is activated, the multiplexor 333 switches the row index number "i" 335A of the ith input port 111 through the multiplexor 333. The output of the multiplexor 333, row index number "i" 335B is also passed to a column compare and select logic tree with the signal Q(i,j) 334.

If the HoL address signal j(i) 222 does not match the column number 331, then the multiplexor 333 is not activated. When the multiplexor 333 is not activated, the multiplexor 333 passes a zero value to the compare and select logic tree for both the signal Q(i,j) 334 and row index number "i" 335B.

Note that the HoL address signal j(i) 222 and the queue size signal Q(i) 223 are passed through the crosspoint logic unit 300 and are used by the ith row (input port i 111) crosspoint logic units inside the other column circuits in the ith row.

Figure 4:
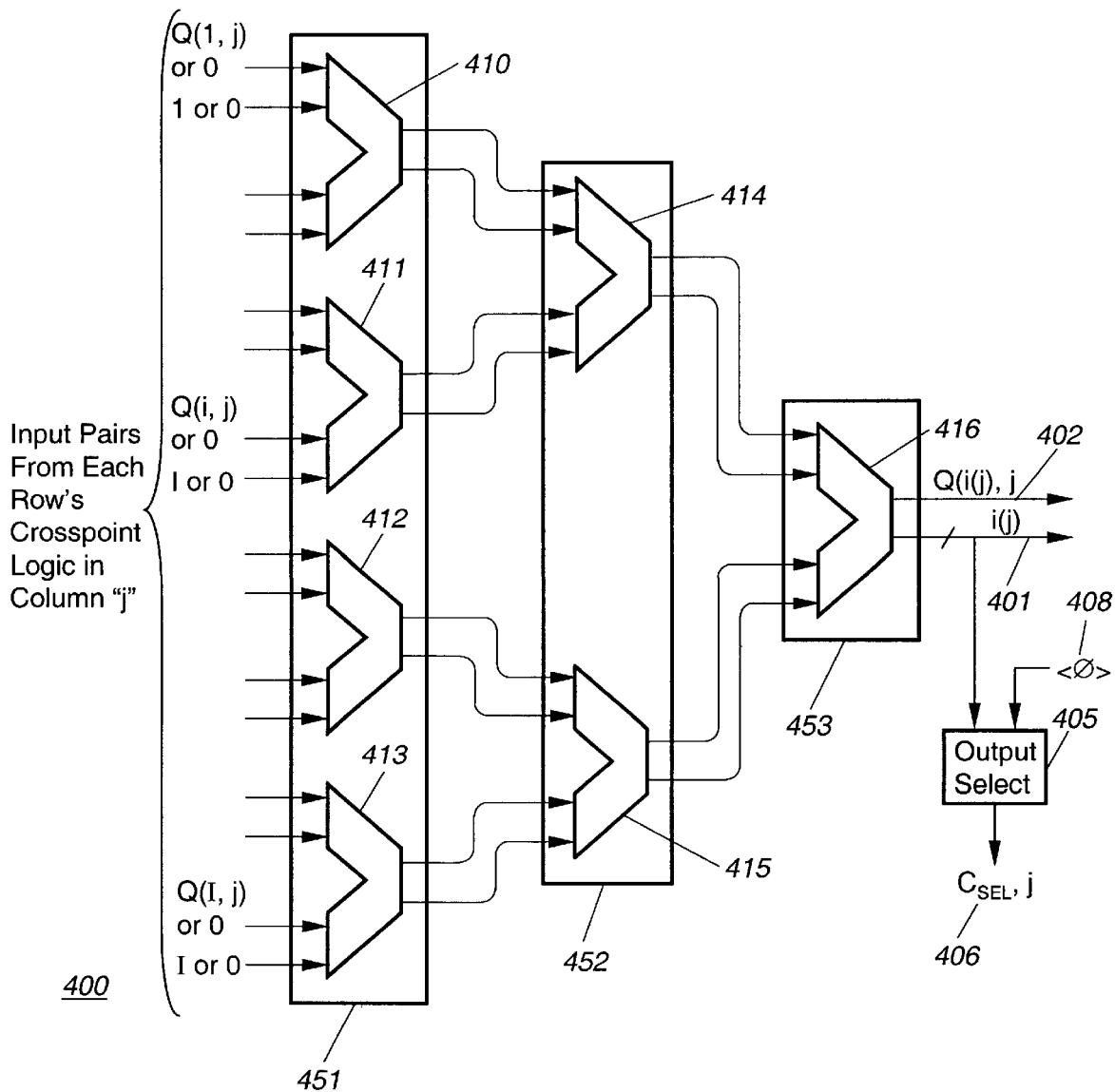
FIG. 4 illustrates a compare and select logic tree for a single column of the crossbar cell switch of the present invention.

Turning to FIG. 4, that figure illustrates a preferred embodiment of a compare and select logic tree 400 for a column circuit having eight input ports and receiving input from eight crosspoint logic units (I=8). The logic tree 400 includes a first echelon 451 including comparators (410–413), a second echelon 452 including comparators (414–415), and a third echelon 453 including a comparator 416.

The logic tree 400 receives as inputs from each crosspoint logic unit either the queue size (for example, the Q(i,j) signal 334 when the HoL address signal j(i) 222 indicates output port j 121) and the row index number (for example, "i" when the signal is from the logic unit 300 of the i$^{th}$ row) or zeros from the multiplexor 333 inside each crosspoint logic unit within column circuit j 131. Thus, when the HoL address signal j(i) 222 at any crosspoint logic unit in column circuit j 131 indicates output port j 121, the logic tree receives non-zero queue size indicators from each input port currently having output port j 121 as the destination output port for its HoL cell.

The logic tree may be implemented as a binary comparison tree that has a number of echelons in its structure equal to the binary logarithm of the number of input ports (rounding up to the nearest integer for non-integer results). Thus, for the exemplary embodiment of 8 input ports, the binary comparison tree has log$_2$ 8=3 echelons. For an embodiment with 12 input ports, log$_2$ 12 yields 3.464, a non-integer. Thus, the number of echelons is rounded up to the next integer (four). The logic tree 400 outputs the identity of the input port having the largest queue size among those input ports with a HoL cell destined for the output port of column circuit j 121. The output of the logic tree 400 is the row address signal i(j) 401. The row address signal i(j) 401 is provided to each logic unit in the column circuit, and is thus a vertical row address signal.

The row address signal i(j) 401 is also provided to an output select logic 405 which generates the C$_{sel}$,j signal 406. At the output select logic 405, the row address signal i(j) 401 is logically compared with a constant logical zero 408. Thus, the output select logic 405 transmits a zero value if the row address signal i(j) 401 is zero (no HoL cells are being sent to the output port j 121) and transmits a non-zero value otherwise. That is, the C$_{sel}$,j signal 406 provides an indication that an HoL cell is to be transferred from any of the input ports to an output port j 121 during he current switching epoch.

Output select logic 405 may be implemented, for example, as a logical OR-gate (or as a logical NAND gate if the constant logical zero 408 is changed to a constant logical one). The C$_{sel}$,j signal 406 is transmitted to the output port j 121 and activates the output port j 121 to receive the HoL cell that will be transmitted from the input port.

Figure 5:
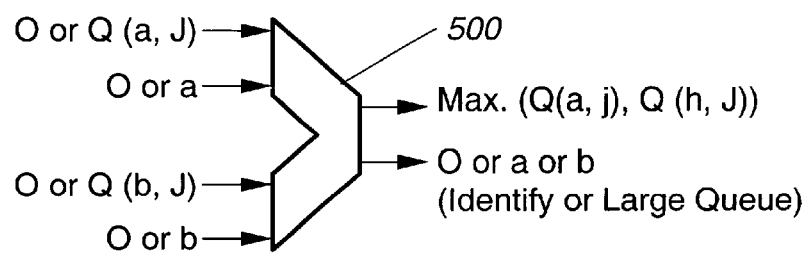
FIG. 5 shows a two-way comparator of the present invention.

The operation of a two-way comparator is illustrated in FIG. 5. At either input, the two-way comparator 500 receives either a zero or the queue size and the input port index or a zero from one of the multiplexors of the logic units. If both queue size inputs to the comparator 500 are zero, both the queue size and the row indicator outputs from the comparator 500 are zero. If either or both inputs to the comparator 500 are non-zero, the comparator 500 compares the queue sizes of the inputs and provides as an output the larger of the two queue sizes and the associated row indicator. The output of the comparator 500 thus represents the input port and the queue size of the HoL cell with the greater queue size. In the event of a tie (that is, when the queue sizes of both inputs to the comparator 500 are equal) the comparator 500 may arbitrarily decide which of the two inputs to transmit. For example, the comparator 500 may transmit the HoL cell associated with a numerically lesser input port in the 1 to I index of input ports or may alternate between or randomly select between the ports.

Turning again to FIG. 4, each comparator (410–413) in the first echelon 451 of the exemplary logic tree 400 receives input from two of the multiplexors of the crosspoint logic units in the column circuit. The comparators (410–413) in the first echelon 451 compare their inputs and transmit the results as inputs to the comparators (414–415) of the second echelon 452. The comparators (414–415) in the second echelon 452 then compare their inputs and transmit the result as inputs to the comparator 416 of the third echelon 453. The comparator 416 of the third echelon 453 then compares its inputs and transmits the result as the row address signal i(j) 401. The queue size output Q(i(j),j) 402 from the final comparator 426 is not used further in the arbitration process. In the event that no HoL cell is currently addressed to the output port j the logic tree outputs a row address signal i(j) 401 of zero and deactivates its output port by the column select signal C$_{sel}$,j 406.

Although the exemplary embodiment of the logic tree 400 in FIG. 4 includes inputs from the multiplexors of eight crosspoint logic units, the number of inputs to the logic tree 400 need not be constrained to any particular number or set of numbers. If the number of input ports is not an integer power of two, additional comparators may be added to the preferred embodiment to perform the comparison. If an embodiment includes an odd number of input ports, an additional comparator, receiving input from the multiplexor of the odd-numbered input port and comparing that input with a constant zero, may be added.

Referring again to FIG. 3, the row address signal i(j) 401 is routed back to each crosspoint logic unit of the column circuit. At each crosspoint logic unit, row select logic 336 receives as inputs both the row address signal i(j) 401 and the constant row identity 340. The row select logic 336 compares the row address signal i(j) 401 and the row identity 340. When the row address signal i(j) 401 and the row identity 340 are the same, the row select logic 336 activates the Select i,j signal 350. The Select i,j signal 350 activates the logic gate 337. Activating the logic gate 337 forms an electrical connection between the data bus D(i) 224 of the input port i 111 (the $i^{th}$ row data bus) and the data bus of the output port j 121, the data bus D(j(i)) 227 (the $j^{th}$ column data bus). The row select logic 336 also activates the signal $R_{sel}$,i 225 which traverses all of the crosspoint logic units associated with input port i 111 (the $i^{th}$ row i 220). The signal $R_{sel}$,i 225 also serves to activate the input queue of input port i 111 and cause the input queue to transmit its HoL cell to the data bus D(i) 224 of the ith row 220 during the subsequent switching epoch.

Row select logic 336 may also include a latch to store the result of the comparison of the row address signal i(j) 401 and the row identity 340 of the present switching epoch and provides the result as the output of the row select logic 336 during the subsequent switching epoch. Use of the latch thus allows the cell switching of the present switching epoch to proceed in parallel with the arbitration process of the logic tree 400 for the subsequent switching epoch.

Once the output port j 121 has been activated (and thus is prepared to receive a cell from an input port during the switching epoch) by the $C_{sel}$,j signal 406, and the input port i 111 has been activated by the $R_{sel}$,i signal 225, the output port j 121 the HoL cell is transmitted over the data bus D(i) 224. The data bus D(i) 224 is then electrically connected to the $j^{th}$ column's data bus D(j) 227 via logic gate 337. The HoL cell is then transmitted to the output port j 121.

The width of the data buses D(i) 224 and D(j) 227 and the number of cycles to transmit the HoL cell may vary depending upon the implementation. For example with a data bus width of 8 bits, 53 cycles would be required to transfer a standard ATM (Asynchronous Transfer Mode) cell. Alternatively, with a data bus width of 424 bits (8*53) a cell may be transferred in a single cycle.

Figure 6:
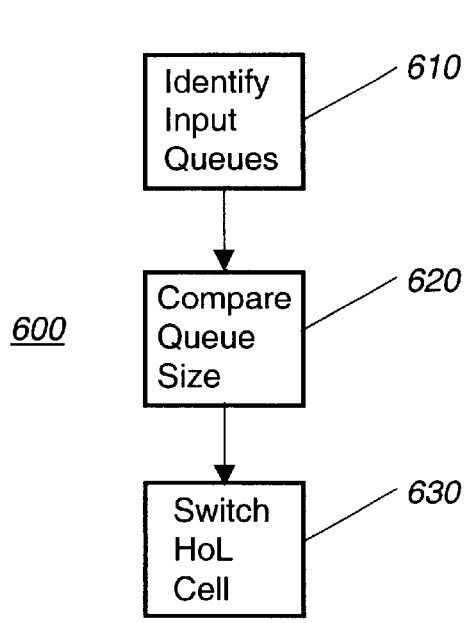
FIG. 6 shows a high level flowchart of the arbitration method of the present invention.

FIG. 6 is a flowchart 600 of the method of the present invention. First, the input port queues having HoL cells directed to a predetermined output port are identified at step 610. Next, the sizes of the input queues at the identified ports are compared at step 620 and a queue select signal is generated in response to the comparison. The queues may be compared (step 620) in a variety of ways including on the basis of the number of cells in the queue, the indices of the most significant bits of the queue sizes, the most significant bits of the binary logarithm of the queue sizes, or the integer portion of the binary logarithm of the queue sizes. Finally, an HoL cell is switched 630 from an associated input queue to an output port in response to the queue select signal.

Each switching epoch includes an arbitration period and a data transfer period, each comprised of a series of clock cycles. The first portion of the switching epoch is the arbitration period which is devoted to the input queue arbitration process described above. When the arbitration period has elapsed, the $j^{th}$ output port is connected to the input port having a HoL cell directed to output j (if any) and having the largest queue size among all input ports currently having an HoL directed to output j. If no input port has a HoL cell intended for output port j, then output port j remains inactive during the data transfer period of the switching epoch. The arbitration process described above takes place at each column circuit in parallel. Thus, at the end of the arbitration period, several input ports (each with a HoL cell directed to a different output port) may be connected to their respective output ports.

Following the arbitration period, a data transfer period ensues. During the data transfer period, the HoL cells are clocked out of their respective input queues (at any input port with an active $R_{sel}$,i control signal) and the HoL cells are then transmitted to their respective output ports. These HoL cells are also transmitted concurrently.

Preferably, instead of performing the arbitration activity and then performing the data transfer activity sequentially at the conclusion of the arbitration activity, the arbitration period and the data transfer period may proceed concurrently using a pipelined approach. In the pipelined approach, the data transfer activity for the current switching epoch n, proceeds in parallel with the arbitration activity for the next switching epoch, n+1.

Figure 7:
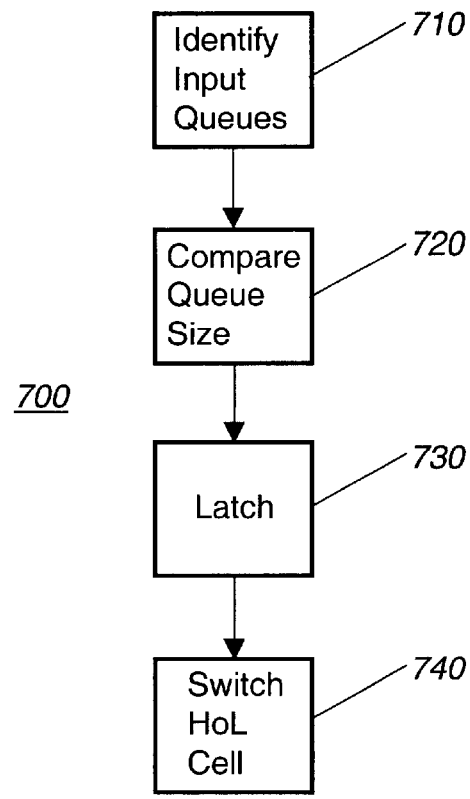
FIG. 7 shows a high level flowchart of the parallel arbitration method of the present invention.

FIG. 7 is a flowchart 700 of the pipeline approach. As in FIG. 6, first the input port queues having HoL cells directed to a predetermined output port are identified at step 710. Next, the sizes of the input queues at the identified ports are compared at step 720 and a queue select signal is generated in response to the comparison. Again, the queues may be compared in a variety of ways including on the basis of the number of cells in the queue, the indices of the most significant bits of the queue sizes, the most significant bits of the binary logarithm of the queue sizes, or the integer portion of the binary logarithm of the queue sizes. The crosspoint select signal 350 is latched at step 730 to retain the switching path setup at epoch n while arbitration proceeds anew at switching epoch n+1. Finally, an HoL cell is switched at step 740 from an associated input queue to an output port via the path established by the latched crosspoint select signal 350. While the input queues of the current switching epoch are being compared and identified, the chosen cell of the previous switching epoch is being switched at step 740. The flowchart 700 thus operates as a pipeline and proceeds in parallel.

Representing the time period of the arbitration period as $T_{arb}$ clock cycles and representing the time period of the data transfer period as $T_{dat}$ clock cycles, the total time period, $T_{tot}$, required for each switching epoch may be expressed as $T_{tot}=T_{arb}+T_{dat}$ for sequential arbitration and data transfer activity. If the arbitration and data transfer activity take place in parallel, the total time required for each switching epoch may be expressed as $T_{tot}=\text{Max}[T_{dat}, T_{arb}]$ where the Max[x,y] function returns the greater of x and y.

Thus, in a parallel system, the time for the overall switching epoch may be condensed to the greater of the arbitration time and the data transfer time which can considerably enhance the performance of the crossbar cell switch. Implementing the preferred embodiment in parallel would also serve, for example, to improve the overspeed ratio and reduce average queue length, thus minimizing the switching delay over the crossbar cell switch as well as allowing the crossbar cell switch to be implemented with smaller, lighter buffers for the queues.

For a parallel implementation of the above preferred embodiment, the logic structure in FIGS. 1–5 may be used with the addition of the latch function or the row select logic 336. Assuming that the data transfer period is greater than the arbitration period, he row select logic 336 waits with the result of the arbitration period of the current switching epoch (n+1) while the data transfer period of the previous switching epoch (n) takes place. At the conclusion of the data transfer period of the previous switching epoch (n), the result of the arbitration period of the current switching epoch (n+1) may be latched immediately and the data transfer period of the current switching epoch (n+1) may immediately commence and the apparatus may initiate arbitration for epoch (n+2).

Additionally, while the above preferred embodiment utilizes an input cell queue measurement in terms of the actual number of cells in the input queue, a number of similar techniques may be implemented. For example, the comparators may be supplied with the binary index of the most significant bit of the queue size, the most significant bit of the binary logarithm of the queue size.

To illustrate this, consider two input queues, one queue including 7 cells and the other queue including 2 cells. Expressing the number of cells in each queue as an 4-bit binary sequence yields (0111) and (0010) respectively. Labeling binary indices of the 4-bit binary sequences as (4,3,2,1), the index of the most significant bit of the queue sizes of the seven and two element queues are 3 and 2 respectively.

The comparators may also be supplied the integer portion of the binary logarithm of the queue size. While these techniques may increase the number of "ties" in the comparators (the queue sizes of both inputs to the comparators are equivalent), ties do not add significantly to the time required for the arbitration period.

Additionally, these techniques would serve to reduce the number of bits needed to be supplied to the comparators and hence increase the speed of the arbitration process while decreasing the overall weight of the crossbar cell switch. This would provide the benefits of reducing the switching delay for the crossbar cell switch as well as significantly decreasing the costs of installing such a crossbar cell switch in satellite-based embodiments.

The present invention thus provides more efficient switching between the input and output ports of the crossbar cell switch by switching data cells based on the size of their input port queues. The present invention provides a crossbar cell switch which may utilize a lower overspeed ratio. The present invention reduces the transit delay through the switch. The improved throughput also allows the use of smaller buffers to accommodate the input queues which may lower the overall weight of the switch thus.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. A method for enhancing the performance of a crossbar cell switch having buffers at each input port for holding cells in queue, including a Head of Line (HoL) cell, the method comprising the steps of:

identifying input queues having HoL cells directed to a predetermined output port;

comparing sizes of said input queues and responsively generating a queue select signal; wherein said comparing step comprises comparing indices of most significant bits of said queue sizes; and switching a HoL cell from an associated input queue to an output port in response to said queue select signal.

2. The method of claim 1 further comprising generating a horizontal row select signal.

3. The method of claim 2 further comprising generating a column select signal.

4. The method of claim 1 wherein said identifying step comprises identifying input queues having Asynchronous Transfer Mode (ATM) HoL cells directed to a predetermined output port.

5. The method of claim 1 comprising performing said identifying step prior to performing said comparing step.

6. The method of claim 1 wherein:

said identifying step further comprises identifying, for epoch (n+1), the sizes of said input queues, said comparing step comprises comparing, for epoch (n+1), the sizes of said input queues, and said switching step comprises switching, for epoch (n), in response to said queue select signal.

7. A method for enhancing the performance of a crossbar cell switch having buffers at each input port for holding cells in queue, including a Head of Line (HoL) cell, the method comprising the steps of:

identifying input queues having HoL cells directed to a predetermined output port;

comparing sizes of said input queues and responsively generating a queue select signal representing an input queue having the greatest size; and switching a HoL cell from an associated input queue to an output port in response to said queue select signal.

8. A method for enhancing the performance of a crossbar cell switch having buffers at each input port for holding cells in queue, including a Head of Line (HoL) cell, the method comprising the steps of:

identifying input queues having HoL cells directed to a predetermined output port;

comparing most significant bits of a binary logarithm of queue sizes and responsively generating a queue select signal; and switching a HoL cell from an associated input queue to an output port in response to said queue select signal.

9. A method for enhancing the performance of a crossbar cell switch having buffers at each input port for holding cells in queue, including a Head of Line (HoL) cell, the method comprising the steps of:

identifying input queues having HoL cells directed to a predetermined output port;

comparing the integer portion of a binary logarithm of queue sizes of said input queues and responsively generating a queue select signal; and switching a HoL cell from an associated input queue to an output port in response to said queue select signal.

10. A crossbar cell switch, including arbitration logic, the crossbar cell switch comprising:

a plurality of input ports and associated buffers at each input port for queuing cells including a Head of Line (HoL) cell;

an output port; and a column circuit connecting said input ports to said output port, said column circuit comprising:
queue size arbitration logic for determining
a greatest queue size; and
a vertical row address signal output generated by said queue size arbitration logic.

11. The crossbar cell switch of claim 10 wherein said column circuit includes a logic unit for each input port.

12. The crossbar cell switch of claim 11 wherein each logic unit includes an HoL address input and a queue size input.

13. The crossbar cell switch of claim 12 further comprising row selection logic including a horizontal row select output.

14. The crossbar cell switch of claim 10 further comprising at least one additional output port and at least one additional column circuit comprising additional queue size arbitration logic and an additional vertical row select signal output.

15. The crossbar cell switch of claim 14 wherein each of said additional column circuits include a logic unit for each input port.

16. The crossbar cell switch of claim 15 wherein each logic unit includes an HoL address input and a queue size input.

17. The crossbar cell switch of claim 16 further comprising row selection logic including a horizontal row select output for each logic unit.

18. The crossbar cell switch of claim 14 wherein said additional queue size arbitration logic comprises a logic tree.

19. The crossbar cell switch of claim 18 wherein said logic tree comprises cascaded comparators.

20. The crossbar cell switch of claim 19 wherein said comparators include a queue size input and a row index input.

21. The crossbar cell switch of claim 19 wherein said comparators include binary index inputs representing queue sizes and row index inputs.

22. The comparators of claim 19 wherein said comparators include logarithm inputs representing queue sizes.

23. The crossbar cell switch of claim 22 wherein said logarithm inputs are binary logarithm inputs.

24. The crossbar cell switch of claim 18 wherein one of said comparators includes said additional vertical row select signal output.

25. The crossbar cell switch of claim 24 further comprising a column select signal output associated with each column circuit.

26. A crossbar cell switch comprising:
a plurality of input ports and associated buffers at each input port for queuing cells including a Head of Line (HoL) cell;
an output port; and
a column circuit connecting said input ports to said output port, said column circuit comprising:
queue size arbitration logic for determining a greatest queue size, said queue size arbitration logic comprising a logic tree; and
a vertical row address signal output generated by said queue size arbitration logic.

27. The crossbar cell switch of claim 26 wherein said logic tree comprises cascaded comparators.

28. The crossbar cell switch of claim 27 wherein said comparators include binary index inputs representing queue sizes and row index inputs.

29. The comparators of claim 27 wherein said comparators include logarithm inputs representing queue sizes.

30. The crossbar cell switch of claim 29 wherein said logarithm inputs are binary logarithm inputs.

31. The crossbar cell switch of claim 26 wherein one of said comparators includes said vertical row address signal output.

32. The crossbar cell switch of claim 31 further comprising a column select signal output.

33. The crossbar cell switch of claim 31 further comprising a latch connected to said vertical row address signal output.

34. A crossbar cell switch comprising:
a plurality of input ports and associated buffers at each input port for queuing cells including a Head of Line (HoL) cell;
an output port; and
a column circuit connecting said input ports to said output port, said column circuit comprising:
queue size arbitration logic for determining a greatest queue size, said queue size arbitration logic comprising a logic tree of cascaded comparators including a queue size input and a row index input.

* * * * *